United States Patent [19]

DeGuiseppi et al.

[11] Patent Number: 4,623,673

[45] Date of Patent: Nov. 18, 1986

[54] URETHANE-MODIFIED POLYISOCYANURATE RIGID FOAM

[75] Inventors: David T. DeGuiseppi, Lawndale; Gilda C. Gonzales, Carson, both of Calif.

[73] Assignee: The Dow Chemical Company, Midland, Mich.

[21] Appl. No.: 791,030

[22] Filed: Oct. 24, 1985

[51] Int. Cl.$^4$ ............................................. C08G 18/14
[52] U.S. Cl. ...................................... 521/110; 264/51; 264/53; 521/131; 521/160
[58] Field of Search ........................ 521/131, 110, 160; 264/51, 53

[56] References Cited

U.S. PATENT DOCUMENTS

| | | | |
|---|---|---|---|
| 3,745,133 | 7/1973 | Comunale et al. | 260/2.5 |
| 3,899,443 | 8/1975 | Reymore et al. | 252/431 C |
| 3,986,991 | 10/1976 | Kolakowski et al. | 260/2.5 |
| 4,011,180 | 3/1977 | Lockwood et al. | 260/2.5 |
| 4,039,487 | 8/1977 | Kolakowski et al. | 260/2.5 |
| 4,101,465 | 7/1978 | Lockwood et al. | 521/118 |
| 4,237,238 | 12/1980 | DeGuiseppi et al. | 521/131 |
| 4,411,949 | 10/1983 | Snider et al. | 428/304.4 |
| 4,417,001 | 11/1983 | Svoboda et al. | 521/114 |

*Primary Examiner*—Maurice J. Welsh
*Attorney, Agent, or Firm*—James S. Rose

[57] ABSTRACT

Improved crack-free rigid cellular polyisocyanurate polymers are disclosed that are derived from the reaction of an organic polyisocyanate combination comprising two particular types of polymethylene polyphenyl polyisocyanates (a) and (b), a trimerization catalyst, minor amount of a polyol, a surfactant, and an inert volatile blowing agent having a boiling point from about 30° C. to about 90° C.

The novel rigid foams are particularly useful in preparing high molded bodies of foam by making multiple pours or lifts on top of each other in a mold. The resultant molded body comprises a multiple of molded parts firmly fused to each other and crack-free. Such high molded bodies and process therefor are particularly useful in the insulation of ships.

20 Claims, No Drawings

URETHANE-MODIFIED POLYISOCYANURATE RIGID FOAM

FIELD OF THE INVENTION

This invention relates to cellular polyisocyanurates and is more particularly concerned with improved crackfree polyisocyanurate cellular polymers containing minor amounts of polyurethane linkages and molded bodies produced therefrom.

DESCRIPTION OF THE PRIOR ART

Cellular polymers in which the major recurring polymer unit is isocyanurate, are well known and widely used items of commerce; see for example U.S. Pat. Nos. 3,745,133, 3,986,991, 3,899,443, 4,011,180, 4,039,487, 4,101,465, 4,237,238, 4,411,949, and 4,417,001.

Generally speaking, such foams are characterized by better fire resistance and lower smoke evolution on burning when compared with polyurethane foams of comparable physical properties. While enjoying these beneficial properties, the polyisocyanurate foams have suffered from such problems as brittleness or so-called friability, which, the above prior art teaches, can be overcome by the addition of minor amounts of polyols to form urethane linkages along with the majority isocyanurate linkages. Polyisocyanurate foams having good physical properties and being free of internal cracks can be obtained in the manufacture of rigid slab or bunstock so long as high bun heights are not required.

Unfortunately, the prior art polyisocyanurate-polyurethane foams still suffer from the serious drawback of not being moldable to foam heights much over 3 to 4 feet. Attempts to mold at heights greater than 4 feet, result in internal cracks and reactivity problems and poor quality moldings having inferior physical properties. If one attempts to overcome this problem by resorting to multiple pours on top of each other to make high molded foam heights, the results are even worse. Not only do internal cracks occur but also interlaminate cracks form between the molded parts from the different pours. Furthermore, up-lifts occur between pours, that is to say, one molded part separates and curls upward at the edge of the mold away from its lower molded counterpart.

Surprisingly, we have now found that through the use of a narrow class of polyisocyanates in combination with a particular class of blowing agents that the problems noted above can be overcome and that relatively high polyisocyanurate-polyurethane moldings can be prepared particularly by employing the multiple pour technique.

SUMMARY OF THE INVENTION

This invention comprises improved rigid cellular polymers in which the major recurring polymer unit is isocyanurate which polymers comprise the product obtained by reacting together an organic polyisocyanate, a trimerization catalyst, and a minor amount of a polyol in the presence of a blowing agent and a surfactant wherein the improvement comprises employing as said polyisocyanate and said blowing agent, A. a polyisocyanate combination comprising first and second polymethylene polyphenyl polyisocyanate mixtures said first mixture (a) comprising a methylenebis(phenylisocyanate) [MDI]content of from about 20 to about 85 percent by weight with the remainder comprising polymethylene polyphenyl polyisocyanates of functionality greater than 2.0 and wherein said MDI has a 4,4'-isomer content of at least about 95 percent; and said second mixture (b) comprising an MDI content of from about 50 to about 75 percent by weight with the remainder comprising polymethylene polyphenyl polyisocyanates of functionality greater than 2.0 and wherein the 2,4'-isomer content of said MDI is at least about 10 percent with the balance comprising the 4,4'-isomer, said (a) and said (b) being present in such proportions by weight to provide said cellular polymer substantially free of internal cracks; and B. an inert volatile organic blowing agent having a boiling point of from about 30° to about 90° C.

The invention also comprises a process for preparing a molded body comprising a plurality of fused molded parts each consisting of an improved rigid polyisocyanurate cellular polymer in accordance with the above description said molded body having a height of at least 5 feet and being substantially free of internal cracks said process comprising, I. reacting together in a mold of at least equivalent height to said molded body the following ingredients:

A. said polyisocyanate combination described in (A) above and in such proportions by weight to provide said cellular polymer substantially free of internal cracks;

B. said inert volatile organic blowing agent described in (B) above;

C. from about 0.05 to about 0.5 equivalent, per equivalent of said polyisocyanate combination, of an organic polyol;

D. an isocyanate trimerization catalyst; and

E. a hydroxyl containing silicone surfactant;

II. allowing the cellular polymer from reaction sequence (I) to rise fully to form a molded part; and III. repeating said reaction sequence (I) a plurality of times on top of each preceding fully risen molded part to form said molded body.

The invention also comprises the molded foam bodies prepared in accordance with the above process.

DETAILED DESCRIPTION OF THE INVENTION

The improved rigid cellular polyisocyanurates in accordance with the present invention are prepared using any of the procedures and equipment conventional in the foam art. For typical teaching see the U. S. patents cited supra whose disclosures with respect to the preparation of polyisocyanurate foams including ingredients, except for the novel ingredients described below, and procedures are incorporated herein by reference.

The novelty in the present invention resides in the particular choice of polyisocyanate and blowing agent ingredients, both defined above under (A) and (B), which are employed in the preparation of the cellular polymers.

In respect of the polyisocyanate combination the first (a) and second (b) polymethylene polyphenyl polyisocyanate mixtures must be employed together. Polymers prepared using either (a) or (b) alone as the polyisocyanate component tend not to be crack-free. More importantly, multiple pours to form high molded bodies cannot be properly made. This aspect of the present invention will be discussed in greater detail hereinbelow. Furthermore, the addition of another polymethylene polyphenyl polyisocyanate mixture not conforming to the limitations of either (a) or (b) will result in foams not in accordance with the present invention.

A determination of the exact proportions of (a) or (b) necessary for the optimization of the foam properties is readily determined by one skilled in the art. These proportions can depend on such factors as the respective methylenebis(phenylisocyanate) [MDI]contents of (a) and (b), their respective isomer contents, and the like. Advantageously, (a) comprises from about 50 to about 80 percent by weight of said combination with (b) from about 50 to about 20 percent by weight. Preferably (a) is from about 55 to about 70 percent by weight and (b) from about 45 to about 30 percent by weight. Both types of polymethylene polyphenyl polyisocyanate mixtures are very well known and are commercially available.

The mixture (a) has the MDI content of from about 20 to about 85 percent by weight with the remainder comprising the polymethylene polyphenyl polyisocyanates of functionality greater than 2.0. Preferably, the MDI content falls within the range of about 25 to about 45 percent by weight. In respect of the isomer content of this mixture the MDI has the predominant 4,4'-isomer content of at least about 95 percent with the remainder comprising the 2,4'-isomer. It will be readily understood by one skilled in the art that some mixtures can contain very small proportions, for example from zero to about 2 percent of the 2,2'-isomer, and such mixtures can be employed in the present invention. It will also be readily understood that the isomer distributions of the higher functional polymethylene polyphenyl polyisocyanates will be governed according to the isomer proportions of their MDI components. Preferably, the 4,4'-isomer content falls within the range of from about 97 to about 99.5 percent and the viscosity of the mixture (a) falls within a range of from about 500 to about 1500 cps. as determined at about 25° C.

The mixture (b) can be any of the known polymethylene polyphenyl polyisocyanate mixtures which are rich in MDI content and, further, wherein the MDI isomer content is considerably higher in 2,4'-isomer content than the mixture (a) discussed above. Advantageously, the MDI content is from about 50 to about 75 percent by weight with the remainder comprising the polymethylene polyphenyl polyisocyanates of functionality greater than 2.0. Preferably, the MDI content falls within the range of about 55 to about 70 percent by weight. The 2,4'-isomer content is at least about 10 percent with the balance comprising the 4,4'-isomer and any small proportion of 2,2'-isomer which may be present. Preferably, the 2,4'-isomer content is from about 10 to about 30 percent, most preferably, from about 10 to about 15 percent. Similarly to the mixture (a), the isomer distributions of the higher functional polymethylene polyphenyl polyisocyanate members in (b) are governed according to the isomer contents of their MDI components.

In respect of the blowing agent (B) any inert organic blowing agent meeting the above limitations can be employed. The term "inert" means any blowing agent that will not react with any of the foam forming ingredients or otherwise interfere with the foam forming process. The term "blowing agent" means a volatile solvent which upon vaporization can cause the blowing action forming the cellular polymer.

If the preparation of the present cellular polymers is attempted with a blowing agent having a boiling point outside of the above defined range, the beneficial properties characteristic of the present foams cannot be obtained. For example, the use of monofluorotrichloromethane (b.p. 24° C.) results in cracks in the foam, particularly interlaminate cracks between the junction of old and newly formed foam. Blowing agents having boiling points higher than the upper limit set forth above do not provide adequate blowing action.

Preferably, the boiling point falls within the range of from about 40° to about 60° C., and, most preferably, about 45° to about 50° C. Although any organic blowing agent meeting the above limitations can be employed, the preferred class of blowing agents are the halogenated aliphatic hydrocarbons having a boiling point of from about 40° to about 60° C.

Illustrative but not limiting of the blowing agents are pentane, hexane, cyclohexane, fluorobenzene, methylene chloride, 1,1,2,2-tetrafluoro-1,2-dibromoethane, 1,1,2-trichloro-1,2,2-trifluoroethane, chloroform, 1,2-dichloroethane, trichloroethylene, and t-he like. A preferred group comprises the halogenated aliphatic hydrocarbons set forth above. Most preferred are 1,1,2,2-tetrafluoro-1,2-dibromoethane and 1,1,2-trichloro-1,2,2-trifluoroethane.

The blowing agents are employed in an amount sufficient to give the resultant foam the desired bulk density which is generally between about 1.0 and 20, preferably about 1.5 to about 10, and, most preferably, about 2 to about 8 pounds per cubic foot. Generally speaking, the blowing agent comprises from about 1 to about 30, and, preferably from about 2 to about 15 percent by weight of the total foam forming ingredients.

The polyols employed include any of those employed in the art for making polyisocyanurate-polyurethane foams and are well-known materials. For typical polyols see the patents cited supra whose disclosures relative thereto have already been incorporated herein.

Typically, the polyols have a hydroxyl functionality from about 2 to about 8 or an average value therebetween and a molecular weight falling within the range of about 600 to about 12,000. Included but not limiting thereof are the polyether polyols, polyester polyols, polyol mixtures derived from the alkoxylation of polymethylene polyphenyl polyamine mixtures, polyols obtained by the Mannich condensation of phenolic compounds with formaldehyde and an alkanolamine, phosphorus containing polyols, the so-called reinforced vinyl polyols (see U.S. Pat. Nos. 3,304,273 and 3,523,093), and the scrap derived polyester polyols (see U.S. Pat. Nos. 4,237,238, 4,411,949, and 4,417,001 cited supra which are already incorporated herein by reference); and mixtures of any of the above polyols with diols and/or triols of molecular weight from 60 to about 400.

A preferred group of polyols for use in the present invention are the scrap derived polyester polyols referred to above. Generally speaking, the scrap polyester polyols are characterized by a hydroxyl number of about 30 to about 550, a viscosity at 25° C. of about 1500 to about 100,000 cps and an acid number from about 2 to about 10. Included in this preferred group are the Terate ® type polyols manufactured and sold by Hercules Incorporated of Wilmington, Del. These polyols have been described in detail in U.S. Pat. No. 4,237,238 and they comprise polyol mixtures prepared by the transesterification with a glycol of molecular weight from about 60 to about 400 of a residue obtained after removal of a portion of dimethyl terephthalate product from its esterified oxidate reaction mixture. The scrap polyester polyols of U.S. Pat. No. 4,411,949 are closely related to those above differing primarily in the higher level of dimethyl terephthalate left in the oxidate residue. The scrap polyester polyols of U.S. Pat. No. 4,417,001 are obtained by the digestion of polyalkylene terephthalate scrap in aromatic or aliphatic polyols having a molecular weight of 500 or less such as ethylene glycol, diethylene glycol, propylene glycol, dipropylene glycol, and the like.

Particularly, preferred are the Terate type polyols described above.

Advantageously, the polyol component falls within the range of from about 0.05 to about 0.5, preferably from about 0.1 to about 0.4 equivalent per equivalent of the polyisocyanate combination.

The trimerization catalyst employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329; and the patents cited supra whose disclosures are already herein incorporated.

Typical catalyst classes are the glycine salts and tertiary amine trimerization catalysts and alkali metal carboxylic acid salts disclosed in the above patents and mixtures of the various types of catalysts. Preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

The total quantity of catalyst, including mixtures thereof, in parts by weight per equivalent of polyisocyanate, can be determined easily by trial and error for any formulation in accordance with the present invention. Advantageously, the catalyst is employed within a range of about 0.1 parts to about 20 parts by weight per equivalent of polyisocyanate, preferably, from about 0.5 parts to about 10 parts.

Any surfactant can be employed in the foams of the invention. The preferred type of surfactants are the silicone surfactants particularly the polydimethylsiloxane-polyoxyalkylene block copolymers which are readily available and well-known to those skilled in the art. Most preferred are those block copolymers having a minor hydroxyl content, that is to say, hydroxyl containing silicone surfactants. Typical of such surfactants are DC-193 supplied by Dow Corning, Midland, Mich.; L-5320 and L-5410 supplied by Union Carbide, Danbury, Conn.

Advantageously, the surfactant comprises from about 0.05 to 10, preferably from 0.1 to 6 weight percent of the total foam forming ingredients.

Other optional additives can be employed such as dispersing agents, cell stabilizers, additional surfactants to those called for above, colorants, flame retardants, and the like.

Illustrative but not limiting of the additional surfactants are the tertiary amine ethoxylates supplied under the trade name M-300 and supplied by Texaco Chemical, Bellaire, Tex.

Illustrative but not limiting of the flame retardants which can be employed are tris(2-chloroethyl)phosphate, tris(2-chloropropyl)phosphate, tris(2,3-dibromopropyl)phosphate, tris(1,3-dichloroisopropyl)phosphate, and the like.

The cellular polymers in accordance with the present invention can be manufactured as products in the form of bunstock material, pour-in-place foams, laminate foam sandwich materials, and the like. The products can be used in building construction as thermal insulation and also in the field of sound insulation. As noted above, the foams so produced are essentially free of internal cracks, have good uniform cell structure and are further characterized by having the known beneficial properties of polyisocyanurate foams, particularly improved resistance to burning when compared with polyurethane foams.

However, the major unexpected benefit inherent in the present cellular polymers makes them particularly useful in the preparation of molded bodies prepared from multiple molded parts or pours (also known as "lifts"). As noted above, the present foams can be employed in a process to form molded bodies of at least 5 feet in height which consist of a plurality of fused molded parts each consisting of a separately foamed portion of the cellular polymer. Because of the properties of the present foams, the molded parts are firmly fused or bonded to each other without interlaminate separation and without any uplifting near the edges of the molded bodies where the old and the new foam meet.

The heights to which such molded bodies can be prepared are limited only by the height of the mold and the amount of foam forming ingredients which can be delivered thereto. Generally speaking, mold heights ranging from about 5 to about 25 feet are readily obtainable with mold lengths and widths of from about 1 to about 25 feet and about 1 to about 10 feet respectively. Preferably, mold heights range from about 5 to about 20 feet with lengths and widths of about 5 to about 15 feet and about 2 to about 8 feet respectively.

The height of the individual parts or lifts in any given molded body is not critical but advantageously falls within the range of about 8 inches to about 2 feet, and, preferably, about 10 inches to about 18 inches. It will be obvious to one skilled in the art that each lift does not have to be of equal height but in the interest of smooth operation it is generally preferred to have them all of approximately equal height to facilitate the cycling of the foam forming ingredients to the mold.

The novel process for producing the molded bodies in accordance with the present invention is useful for filling deep voids, particularly the bulkheads and inner hulls of ships.

Furthermore, the cellular polymers in accordance with the present invention meet all of the specifications required for use in the insulation of ships as set forth in MIL-P-24249 (Ships) published Feb. 10, 1967.

The following examples describe the manner and process of making and using the invention and set forth the best mode contemplated by the inventors of carrying out the invention but are not to be construed as limiting.

EXAMPLE 1

This example sets forth the preparation of two polyisocyanurate foam molded bodies (Run 1 and Run 2) in accordance with the present invention. The molded bodies were prepared by making multiple pours or lifts of polyisocyanurate foam prepared from the following components A and B comprising the ingredients in proportions in parts by weight set forth below. Run 1 employed the components in the proportions exactly as set out below. Run 2 differed only by having an additional 0.2 part of the trichlorotrifluoroethane blowing agent in the B side, by having 0.10 part of the α-methylstyrene also in the A side, and by having 1.50 parts of catalyst instead of 1.6.

| Component A | |
|---|---|
| PAPI I[1] | 87.10 |
| PAPI II[2] | 46.20 |
| 1,1,2-trichloro-1,2,2-trifluoroethane | 6.00 |
| Component B | |
| Terate 203[3] | 61.00 |
| Tris-(2-chloroethyl)phosphate | 6.00 |
| M-315[4] | 2.00 |
| DC-193[5] | 3.00 |
| Trimer catalyst[6] | 1.60 |
| 1,1,2-trichloro-1,2,2-trifluoroethane | 6.00 |
| α-methylstyrene[7] | 0.10 |

Footnotes:
[1]PAPI I: a heat treated polymethylene polyphenyl polyisocyanate mixture comprising an MDI content of about 28 to 30 percent by weight (4,4'-isomer content - about 97 percent) with the remainder comprising polymethylene polyphenyl polyisocyanates of functionality greater than 2.0; I.E. = about 140; visc. = 700–1,100 cps (25° C.)
[2]PAPI II: a polymethylene polyphenyl polyisocyanate mixture comprising an MDI content of about 62 percent by weight (2,4'-isomer content = about 12 percent, remainder comprising 4,4'-isomer) with the remainder comprising polymethylene polyphenyl polyisocyanates of functionality greater than 2.0; I.E. = about 132.
[3]Terate 203: a scrap polyester polyol supplied by Hercules Chemical Co., Wilmington, Delaware comprising about 8 to about 12 percent by weight diethylene glycol and about 92 to about 88 percent by weight of the diethylene glycol esterified residue derived from a dimethyl terephthalate oxidate reaction product; OH Eq. Wt. = 175–180; visc. = 16,000–25,000 cps (25° C.); acid # = about 3.
[4]M-315: an amine ethoxylated surfactant; OH # = about 102; supplied by Texaco Chemical Co., Bellaire, Texas.
[5]DC-193: silicone surfactant containing about 2 percent by weight hydroxyl groups; supplied by Dow Corning Corp., Midland, Michigan.
[6]Trimer catalyst: a 50 percent w/w solution of sodium N—(2-hydroxy-5-nonylphenyl)methyl-N—methylglycinate in diethylene glycol; this catalyst disclosed in U.S. Pat. No. 3,903,018.
[7]α-methylstyrene: added as a preservative.

The foams were prepared using a conventional foam metering and dispensing machine having a mixing head equipped with a pin type impeller. The foam forming mixture was dispensed in the A/B proportions by weight of 63.6 and 36.4 respectively to result in the NCO to OH ratio of about 2.89:1

In run 1 a metal mold measuring four feet by eight feet in area by five feet in height was employed. Five separate pours or lifts were made wherein in each pour sufficient amounts of the A and B components were discharged to the mold to result in about 12 inches of fully risen foam of about 6 pound per cubic foot density. About 30 minutes was allowed to elapse between each pour so that fresh foam was formed over fully risen foam. The result was an integrally molded body of polyisocyanurate foam 5 feet high consisting of five separately molded foam parts. All of the parts were firmly fused to each other with no interlaminate cracking between pours and no internal cracks in the foam itself. The overall density was about 6 p.c.f.

Run 2 was simply a repetition of run 1 except that the mold was fifteen feet in height rather than five. Fifteen separate pours or lifts were made one on top of the other with about 30 minutes between each pour. The amount of reactants in each pour was sufficient to form a fully risen molded part of about 11 inches in height. Accordingly, the complete molded body was about 14 feet in height with an area of about four by eight feet. All fifteen molded parts were firmly fused together with no interlaminate cracks between the molded parts. Also, there were no internal cracks within the molded parts of foams.

The molded body was cut into 12 slices each measuring 8 feet×4.7 feet×1 foot. Samples were taken from various locations in each one of the 12 pieces and various tests performed in accordance with the requirements of MIL-P-24249 for ships. The results are set forth below and it will be noted that the foam samples passed all of the required tests. The adhesion tests were carried out not on the samples from the large molded body but on small samples poured in boxes having steel plates in order to facilitate the formation of samples compatible with Instron test equipment.

SUMMARY OF TEST DATA FOR RUN 2 COMPARED WITH THE REQUIREMENTS OF MIL-P-24249 (SHIPS)

| Property | Requirement | Found* |
|---|---|---|
| Density, pcf | maximum of 6.4 | 5.9 |
| Compressive str. (psi) 10% defl. ⊥ to rise (ASTM Test D1621) | 60–130 | 97 |
| Compressive str. (psi) 10% defl. ∥ to rise (ASTM Test D1621) | 80 minimum | 131.5 |
| Tensile str. (psi) ⊥ to rise (ASTM Test D1623) | 80 minimum | 97 |
| Shear strength (psi) ⊥ to rise | 50 minimum | 84 |
| % open cell | 15 maximum | 6 |
| Water absorption lb./sq. ft. of surface[1] | 0.10 maximum | 0.03 |
| Resistance to JP-5 fuel[2] | No deterioration | No softening or No dissolving |
| Humid Aging, 158° F./ 100% R.H. for 7 days Vol. change (%) | ±5 maximum | +3 |
| Compressive str. (psi) 10% defl. ⊥ to rise after humid aging | 60–130 | 98 |
| Fire resistance, sec. (ASTM D1692) | 20 maximum | Does not support combustion after 60 second ignition period |
| Adhesion in Tension (psi)[3] | 30 minimum | 53 |

*All measured properties represent average values from a number of samples.
Footnotes:
[1]Water absorption: Sample of cut foam measured to nearest 0.01 inch is completely immersed in horizontal position in water (at 65°–90° F.) for 10 seconds; drained for 10 seconds and weighed (initial wt.); sample then subjected to a 10 foot head of water (at 65°–90° F.) for 48 hours; drained for 10 seconds and weighed (final wet weight); difference between final and initial weight is the water pick-up expressed in terms of pounds per square foot of cut surface.
[2]Resistance to Jet fuel: Sample immersed in jet fuel JP-5 for 70 hours; removed, lightly blotted with paper towel, and compared to virgin sample for evidence of softening or dissolving.
[3]This test was performed on small samples of foam prepared in small boxes with steel plates so that the foam was bonded to the plates and the load required to pull the plates apart was determined thereby providing an adhesion value in psi at break.

COMPARISON EXAMPLE 2

This comparison example sets forth the preparation of a polyisocyanurate foam molded body (Run 3) not in accordance with the present invention. The molded body was made identically to Run 1 above using the same components A and B set forth in Example 1 except that instead of the 6 parts of the 1,1,2-trichloro-1,2,2-trifluoroethane in each of A and B there was employed 8.9 parts of monofluorotrichloromethane in the B side.

The five separate pours were made into the five foot high mold to form the molded body. Although there were no internal cracks within any of the four molded parts, there were many interlaminate splits and separations between the parts at the edge of the mold called up-lifts.

COMPARISON EXAMPLE 3

This comparison example sets forth the preparation of three polyisocyanurate foam molded bodies (Runs 4 to 6) not in accordance with the present invention. The molded bodies were made identically to Run 1 using five separate pours for each run in the five foot high mold. The same components A and B set forth in Example 1 were employed here except as noted in Table I below for the isocyanate and blowing agent ingredients. The results and appearance of each molded body are set forth in Table I under Remarks.

TABLE I

| Run | 4 | 5 | 6 |
|---|---|---|---|
| Ingredients (parts) | | | |
| PAPI I[1] | 134 | — | 45.22 |
| PAPI III[2] | — | 133 | 43.89 |
| PAPI II[3] | — | — | 43.89 |
| monofluorotrichloromethane | 8.85 | 8.9 | 8.9 |
| Remarks | Up-lift between pours; Internal cracks; Interlaminate splits. | Up-lift between pours; Internal cracks; No interlaminate splits. | Up-lift between pours; Internal cracks; No interlaminate splits. |

Footnotes to Table I
[1]PAPI I: identified in footnote 1 of Example 1.
[2]PAPI III: a polymethylene polyphenyl polyisocyanate mixture comprising an MDI content of about 48 percent by weight (4,4'-isomer content = about 94 to 95 percent) with the remainder comprising polymethylene polyphenyl polyisocyanates of functionality greater than 2.0; I.E. = about 133, visc. = about 180 cps (25° C.).
[3]PAPI II: identified in footnote 2 of Example 1.

It will be noted that using one of the preferred polyisocyanates (PAPI I) alone, or a non-preferred polyisocyanate (PAPI III) alone, or admixing PAPI III with the preferred mixture of PAPI I and II results in up-lifting between the individual pours of each run. At the same time, internal cracks within each molded part are prevalent in all three runs.

We claim:

1. In a rigid cellular polymer in which the major recurring polymer unit is isocyanurate which polymer comprises the product obtained by reacting together an organic polyisocyanate, a trimerization catalyst, and a minor amount of a polyol in the presence of a blowing agent and a surfactant, the improvement which comprises employing as said polyisocyanate and said blowing agent,
   A. a polyisocyanate combination comprising first and second polymethylene polyphenyl polyisocyanate mixtures said first mixture (a) comprising a methylenebis(phenylisocyanate) content of from about 20 to about 85 percent by weight with the remainder comprising polymethylene polyphenyl polyisocyanates of functionality greater than 2.0 and wherein said MDI has a 4,4'-isomer content of at least about 95 percent; and said second mixture (b) comprising an MDI content of from about 50 to about 75 percent by weight with the remainder comprising polymethylene polyphenyl polyisocyanates of functionality greater than 2.0 and wherein the 2,4'-isomer content of said MDI is at least about 10 percent with the balance comprising the 4,4'-isomer, said (a) and said (b) being present in such proportions by weight to provide said cellular polymer substantially free of internal cracks; and
   B. an inert volatile organic blowing agent having a boiling point of from about 30° to about 90° C.

2. A cellular polymer according to claim 1 wherein said blowing agent is a halogenated aliphatic hydrocarbon having a boiling point of from about 40° to about 60° C.

3. A cellular polymer according to claim 1 wherein said polyisocyanate combination comprises from about 50 to about 80 percent by weight of (a) and from about 50 to about 20 percent by weight of (b).

4. A cellular polymer according to claim 1 wherein the MDI content in said polymethylene polyphenyl polyisocyanate mixture (a) is from about 25 to about 45 percent by weight.

5. A cellular polymer according to claim 1 wherein the MDI content in said polymethylene polyphenyl polyisocyanate mixture (b) is from about 55 to about 70 percent by weight wherein said 2,4'-isomer content is from about 10 to about 15 percent with the balance being substantially the 4,4'-isomer.

6. A cellular polymer according to claim 1 wherein said surfactant is a hydroxyl containing silicone surfactant.

7. A cellular polymer according to claim 1 wherein said polyol is employed in the range of from about 0.05 to about 0.5 equivalent per equivalent of said polyisocyanate combination.

8. A rigid cellular polymer substantially free of internal cracks in which the major recurring polymer unit is isocyanurate which polymer comprises the product obtained by reacting together under foam forming conditions,
   A. a polyisocyanate combination comprising
      (a) from about 50 to about 80 percent by weight of a polymethylene polyphenyl polyisocyanate mixture containing from about 25 to about 45 percent by weight of MDI wherein said MDI has a 4,4'-isomer content of at least about 95 percent and the remainder of said mixture comprising polymethylene polyphenyl polyisocyanates of functionality greater than 2.0; and
      (b) from about 50 to about 20 percent by weight of a polymethylene polyphenyl polyisocyanate mixture containing from about 55 to about 70 percent by weight of MDI wherein said MDI has a 2,4'-isomer content of from about 10 to about 15 percent with the balance being substantially the 4,4'-isomer and the remainder of said mixture comprising polymethylene polyphenyl polyisocyanates of functionality greater than 2.0;
   B. a halogenated aliphatic hydrocarbon blowing agent having a boiling point of from about 40° to about 60° C.;
   C. from about 0.05 to about 0.5 equivalent, per equivalent of said polyisocyanate combination, of a polyol mixture prepared by the transesterification with a glycol of molecular weight from about 60 to about 400 of a residue obtained after removal of a portion of dimethyl terephthalate product from its esterified oxidate reaction mixture;
   D. an isocyanate trimerization catalyst; and
   E. a hydroxyl containing silicone surfactant.

9. A cellular polymer according to claim 8 wherein said polyisocyanate combination comprises about 65 percent by weight of said mixture (a) and about 35 percent by weight of said mixture (b).

10. A cellular polymer according to claim 9 wherein said blowing agent is 1,1,2-trichloro-1,2,2-trifluoroethane.

11. A process for preparing a molded body comprising a plurality of fused molded parts of rigid cellular polymer in which the major recurring unit is isocyanurate said molded body having a height of at least 5 feet and being substantially free of internal cracks said process comprising, I. reacting together in a mold of at least equivalent height to said molded body the following ingredients:
  A. a polyisocyanate combination comprising first (a) and second (b) polymethylene polyphenyl polyisocyanate mixtures wherein
    (a) comprises a methylenebis (phenylisocyanate) content of from about 20 to about 85 percent by weight with the remainder comprising polymethylene polyphenyl polyisocyanates of functionality greater than 2.0 and wherein said MDI has a 4,4'-isomer content of at least about 95 percent; and
    (b) comprises an MDI content of from about 50 to about 75 percent by weight with the remainder comprising polymethylene polyphenyl polyisocyanates of functionality greater than 2.0 and wherein said MDI has a 2,4'-isomer content of at least about 10 percent with the balance comprising the 4,4'-isomer, said (a) and (b) being present in such proportions by weight to provide said cellular polymer substantially free of internal cracks;
  B. an inert volatile organic blowing agent having a boiling point of from about 30° to about 90° C.;
  C. from about 0.05 to about 0.5 equivalent, per equivalent of said polyisocyanate combination, of an organic polyol;
  D. an isocyanate trimerization catalyst; and
  E. a hydroxyl containing silicone surfactant;
II. allowing the cellular polymer from reaction sequence (I) to rise fully to form a molded part; and
III. repeating said reaction sequence (I) a plurality of times on top of each preceding fully risen molded part to form said molded body.

12. A process according to claim 11 wherein said blowing agent is a halogenated aliphatic hydrocarbon having a boiling point of from about 40° to about 60° C.

13. A process according to claim 11 wherein said polyisocyanate combination comprises from about 50 to about 80 percent by weight of (a) and from about 50 to about 20 percent by weight of (b).

14. A process according to claim 11 wherein the MDI content in said (a) is from about 25 to about 45 percent by weight.

15. A process according to claim 11 wherein the MDI content in said (b) is from about 55 to about 70 percent by weight and wherein said 2,4'-isomer content is from about 10 to about 15 percent with the balance being substantially the 4,4'-isomer.

16. A process according to claim 11 wherein the reactive ingredients comprise:
  A. a polyisocyanate combination comprising,
    (a) from about 50 to about 80 percent by weight of a polymethylene polyphenyl polyisocyanate mixture containing from about 25 to about 45 percent by weight MDI; and
    (b) from about 50 to about 20 percent by weight of a polymethylene polyphenyl polyisocyanate mixture containing from about 55 to about 70 percent by weight MDI wherein said 2,4'-isomer content is from about 10 to about 15 percent with the balance being substantially the 4,4'-isomer;
  B. a halogenated aliphatic hydrocarbon blowing agent having a boiling point of from about 40° to about 60° C.;
  C. from about 0.05 to about 0.5 equivalent, per equivalent of said polyisocyanate combination, of a polyol mixture prepared by the transesterification with a glycol of molecular weight from about 60 to about 400 of a residue obtained after removal of a portion of dimethyl terephthalate product from its esterified oxidate reaction mixture;
  D. an isocyanate trimerization catalyst; and
  E. a hydroxyl containing silicone surfactant.

17. A process according to claim 16 wherein said polyisocyanate combination comprises about 65 percent by weight of said mixture (a) and 35 percent by weight of said mixture (b).

18. A process according to claim 17 wherein said blowing agent is 1,1,2-trichloro-1,2,2-trifluoroethane.

19. A molded body comprising a plurality of fused molded parts of rigid cellular polymer in which the major recurring unit is isocyanurate said molded body having a height of at least 5 feet and being substantially free of internal cracks and prepared in accordance with claim 11.

20. A molded body according to claim 19 having a height of at least 14 feet.

* * * * *